US009213566B2

(12) United States Patent  
Morris et al.

(10) Patent No.: US 9,213,566 B2  
(45) Date of Patent: Dec. 15, 2015

(54) IMPLEMENTING SECURITY IN PROCESS-BASED VIRTUALIZATION

(75) Inventors: James Morris, Northbridge (AU); Daniel J. Walsh, Marlborough, MA (US); Karl Wirth, Bedford, MA (US)

(73) Assignee: Red Hat, Inc., Raleigh, NC (US)

( * ) Notice: Subject to any disclaimer, the term of this patent is extended or adjusted under 35 U.S.C. 154(b) by 1657 days.

(21) Appl. No.: 12/324,415

(22) Filed: Nov. 26, 2008

(65) Prior Publication Data

US 2010/0132011 A1    May 27, 2010

(51) Int. Cl.
```
G06F 9/455      (2006.01)
G06F 21/60      (2013.01)
G06F 21/44      (2013.01)
G06F 21/53      (2013.01)
```
(52) U.S. Cl.
CPC ............ *G06F 9/45537* (2013.01); *G06F 21/44* (2013.01); *G06F 21/53* (2013.01); *G06F 21/604* (2013.01)

(58) Field of Classification Search
CPC ......................................... G06F 21/44–21/629
USPC ................. 713/166; 726/2, 16–19, 26–27, 30
See application file for complete search history.

(56) References Cited

U.S. PATENT DOCUMENTS

| | | | | |
|---|---|---|---|---|
| 2004/0226019 | A1* | 11/2004 | Tucker et al. | 719/310 |
| 2005/0138423 | A1* | 6/2005 | Ranganathan | 713/201 |
| 2005/0268336 | A1* | 12/2005 | Finnegan | 726/15 |
| 2007/0130458 | A1* | 6/2007 | Focke et al. | 713/164 |
| 2008/0184225 | A1* | 7/2008 | Fitzgerald et al. | 718/1 |

OTHER PUBLICATIONS

Qumranet, Inc. "KVM: Kernel-based Virtualization Driver". <http://www.linuxinsight.com/files/kvm_whitepaper.pdf>. Copyright: 2006. Published Earlier Than: Oct. 8, 2007. See: <http://web.archive.org/web/20071008143652/http://www.linuxinsight.com/files/kvm_whitepaper.pdf>.*
Bell et al. "Secure Computer Systems: Mathematical Foundations". Mitre Corporation. AD-770-768. ESD-TR-73-278, vol. I. Electronic System Division, Air Force Systems Command, USAF. Published: Nov. 1973.*
Morris, James. "Svirt requirements v1.0". SELinux Wiki. <http://selinuxproject.org/page/Svirt_requirements_v1.0> Published: Aug. 11, 2008.*

* cited by examiner

*Primary Examiner* — Linglan Edwards  
*Assistant Examiner* — Kevin Bechtel  
(74) *Attorney, Agent, or Firm* — Lowenstein Sandler LLP

(57) ABSTRACT

In one embodiment, a mechanism to implement security in process-based virtualization is disclosed. In one embodiment, a method includes maintaining a security policy for a process-based virtualization system, initializing a virtual machine (VM) in the process-based virtualization system, assigning a security label to the VM, and enforcing the security policy on the VM based on the security label of the VM in order to isolate the VM from other VM's in the process-based virtualization system.

18 Claims, 4 Drawing Sheets

Implement a security policy in a host kernel of the VM system, the security policy to mediate access between the VMs running on the system
310

Initialize a virtual machine in the process-based virtualization system
320

Assign a security label to the VM that is different from any other VM running in the system
330

Enforce the security policy on the VM based on the VM's security label in order to isolate the VM from other VMs in the system
340

Fig. 3

IMPLEMENTING SECURITY IN PROCESS-BASED VIRTUALIZATION

TECHNICAL FIELD

The embodiments of the invention relate generally to process-based virtualization and, more specifically, relate to a mechanism to implement security in process-based virtualization.

BACKGROUND

Virtual systems provide the benefit of running multiple systems on the same machine. One type of virtualization is process-based virtualization. In process-based virtualization, every virtual machine is instantiated within a regular process. One type of process-based virtualization is the kernel-based virtual machine (KVM) infrastructure utilized by Linux. Under KVM's model, each virtual machine (also known as a guest) is a regular Linux process scheduled by the standard Linux scheduler. A normal Linux process has two modes of execution: kernel and user. KVM adds a third mode, a guest mode that has its own kernel and user modes. In addition, KVM may utilize a library called "libvirt" that provides interaction with virtualization capabilities of the kernel.

However, a problem faced by process-based virtualization, including KVM, is that, due to consolidating different processes on the same physical hardware, each individual virtual machine (VM) becomes exposed to security threats from other virtual machines on the system. Previously, a user's system ran on its own separate physical hardware and as such was protected from attacks from other user systems operated outside of the physical hardware. Once consolidated in a virtualization environment, if a controlling entity breaks out of its virtualized system, the controlling entity could attack another VM running on the same server or machine and gain access to private data and other important resources of the other VM.

The current state of process-based virtualization provides minimal security between virtual machines (also known as guests). All guests are launched as the same user and with the same security class, and as such, are not protected from each other. If a controlling entity of a guest was able to break out of its virtualization domain into the hypervisor via a kernel bug, the entity would be able to access the memory and resources of other domains.

Protection currently exists between the host system and its guests via security labels that control access between applications running. The host is assigned a different label than its guests, and access between the host and guests is mediated as defined by the controlling security label policy in the kernel. However, the only security measure that is currently in place for guests in a process-based virtualization system is the typical memory protections offered by the underlying system. For instance, Security Enhanced Linux (SELinux) employs a security system between host and guests by deploying controls that prevent a qemu process from attacking the host machine, but do not prevent it from attacking other images on the host machine, or other qemu processes running other VMs. Therefore, a mechanism to protect virtual machines from one another in a process-based virtualization system would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3 is a flow diagram illustrating implementation of a security policy in a process-based virtualization system according to an embodiment of the invention.

DETAILED DESCRIPTION

Figure 1:
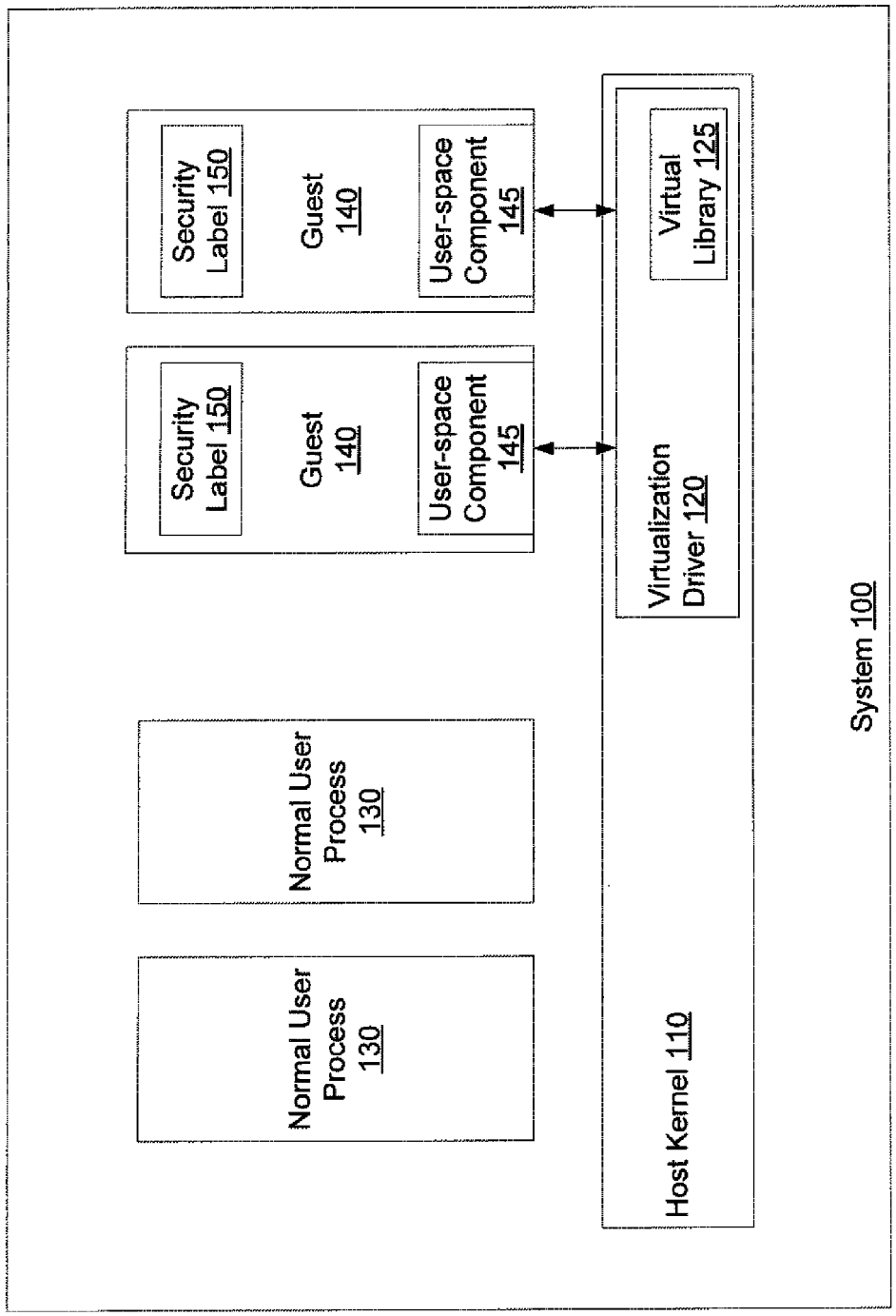
FIG. 1 is a block diagram of a process-based virtualization system implementing a security policy according to an embodiment of the invention.

Embodiments of the invention provide for mechanism to implement security in process-based virtualization. In one embodiment, a method to implement security in process-based virtualization includes maintaining a security policy for a process-based virtualization system, initializing a virtual machine (VM) in the process-based virtualization system, assigning a security label to the VM, and enforcing the security policy on the VM based on the security label of the VM in order to isolate the VM from other VM's in the process-based virtualization system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), Erasable Programmable ROMs (EPROMs), Electrically Erasable Programmable ROMS (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide for implementing security in a process-based virtualization system. Specifically, embodiments of the invention use security labeling to protect virtual machines (VMs) in a process-based virtualization from one another by providing isolation amongst the guests. In one embodiment, mandatory access control (MAC) is utilized to apply MAC labeling to all VMs so that they will have similar isolation protection that one would get if running on separate hardware. In the following description, a VM may also be called a guest or a domain. In another embodiment, discretionary access control (DAC) is utilized via VM labeling to provide security to the VMs, so that they run as different user IDs and benefit from the standard protection between different user IDs.

FIG. 1 is a block diagram of a process-based virtualization system 100 implementing a security policy according to an embodiment of the invention. System 100 may be a computer, a server, or any other processing machine capable of hosting one or more VMs. In some embodiments, system 100 may be implemented in hardware, software, of some combination of hardware and software. In one embodiment, system 100 includes a host kernel 110 with capabilities to implement a process-based virtualization mode. In one embodiment, host kernel 110 is a Linux kernel implementing a kernel-based virtualization model (KVM). However, embodiments of the invention are not limited to a Linux implementation and other operating system kernels are possible to utilize in system 100.

Normal user processes 130 are shown operating in system 100. Normal user processes 130 are the typical processes that run on a host kernel in a non-virtualization environment. In a process-based virtualization system, VMs are run as regular processes, similar to normal user processes 130. In one embodiment, a normal process has two modes of execution: kernel and user. Process-based virtualization adds a third mode: guest mode 140, which has its own kernel and user mode.

Two components assist in simplifying the process-based virtualization of system 100. First, a virtualization driver 120 manages the virtualization hardware and software in system 100, including each guest 140. Second, a user-space component 145 within each guest 140 emulates PC hardware by mapping guest's 140 physical memory and calling virtualization driver 120 to enable guest 140 to execute in guest mode. In one embodiment, the user space component 145 is a modified qemu process.

Virtualization driver 120 may further include a virtualization library 125, which assists in abstracting away different types of virtualization implementations that system 100 may employ. In one embodiment, the virtualization library may be the "libvirt" library in the Linux KVM model. The virtualization library 125 operates to isolate the different management tools needed from many different back ends for the different types of virtualizations. Some different types of virtualization implementations utilized by embodiments of the invention may include KVM, Xen, Lguest, and so on.

Embodiments of the invention provide implementation of security for the VMs (i.e., guest processes 140) of system 100 by integrating security labeling for guests 140. In one embodiment, security labeling is implemented as a mandatory access control (MAC) model. The MAC model operates by assigning security labels to running processes, and then applying an overall security policy to enforce access between processes based on the processes' assigned security label.

In system 100, a security label 150 is assigned to each VM domain, or in other words, to each guest 140. In one embodiment, the security label 150 is stored in a configuration file associated with each guest. In some embodiments, the configuration file may be stored in memory assigned to each guest or maintained by the virtualization driver 120 or the virtualization library 125. Then, in one embodiment, virtualization library 125 applies a security policy (e.g., MAC) that is stored in library 125 to each guest 140 to enforce isolation amongst the guests 140 and mediate access between the guests 140. Access between the guests 140 and their host (e.g., kernel 110) is not negatively impacted by implementation of the security policy in system 100.

Figure 2:
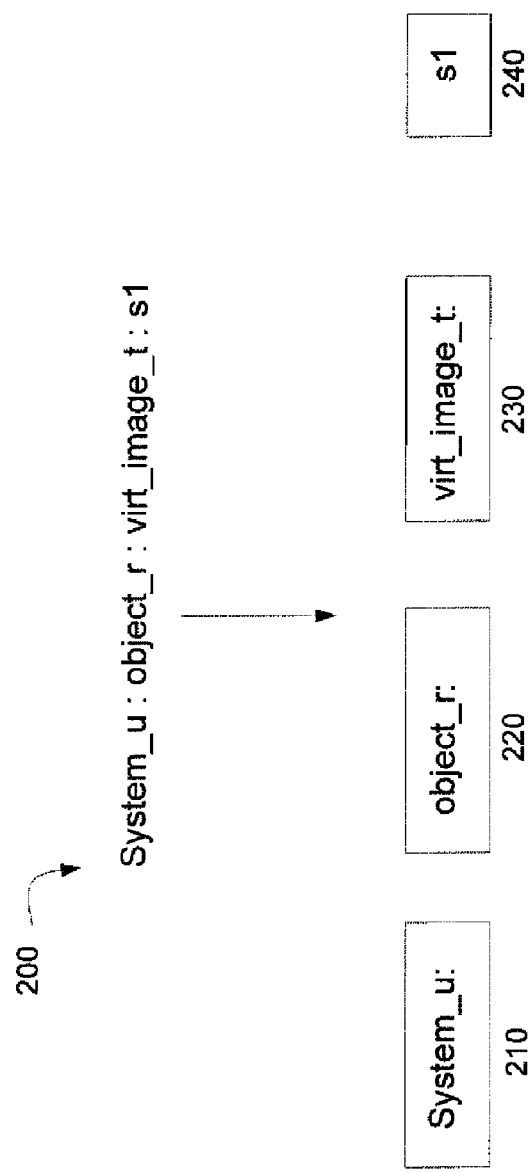
FIG. 2 is a block diagram of a security label according to an embodiment of the invention.

FIG. 2 is a block diagram of a security label 200 that may be assigned to VMs in a process-based virtualization system in embodiments of the invention. In one embodiment, security label 200 is the same as security label 150 described with respect to FIG. 1. Security label 200 is an identifier associated with each VM in a process-based virtualization system and used to enforce a security policy amongst each VM in the system. The security label 200 may be assigned during configuration of the VM. Alternatively, the security label 200 is assigned automatically when the VM is launched. The security policy enforces accesses between the VMs based on their associated security label. In some embodiments, the security labels may be applied to individual resources on each guest (rather than to the entire guest as a whole), so that these resources cannot access other VM's resources unless the security policy allows it.

In one embodiment of the invention, all of the security labels for VMs in the process-based virtualization system are different. Embodiments of the invention may utilize any sort of identifier as a security label, as long as the label meets operating requirements of the underlying system in which the VMs are being deployed. One embodiment of the invention may utilize the unique identifier (UUID) of each VM as or as part of its security label to ensure differentiation amongst each VM security label in the system. In other embodiments, the security label of embodiments of the invention may utilize specific user-defined labels, such as "company confidential", "top secret", "secret", and so on, in the security labels. In such an embodiment, the end user may be able to provide its own user-defined labels to be used as security labels.

In yet other embodiments of the invention, a multi-category system (MCS) labeling may be utilized for security labels. MCS labeling is an adaption of multi-level security labeling and is an access control method in Security Enhanced Linux (SELinux) that uses categories attached to objects (files) and granted to subjects (e.g., processes) at the operating system level. The MCS label is carried in a multi-level security (MLS) label field. For example, as shown in FIG. 2, security label 200 is one possible embodiment of a MCS security label applied to a VM in a SELinux system implementing process-based virtualization. In FIG. 2, security label 200 is broken down into separate fields 210-240. The first field 210 is a descriptor of the system in which the VM resides. The second field is an identifier of the actual component, process, or VM 220. The third field 230 identifies the type of the VM (e.g., a general VM, no network access VM, network access VM, etc.). This type field 230 historically has been utilized to separate and differentiate between processes.

Lastly, the fourth field 240 is the MCS label. Traditionally, the MCS label 240 has been utilized to assign a security value to fields (e.g., "top secret", "secret", etc.) and using that as a way to isolate components of the same type from each other. However, embodiments of the invention may instead utilize the MCS field 240 for VM security labeling by allocating one of multiple categories (i.e., C1 to C1024 or S1 to S1024) to a VM when the VM is launched, and then internally map the UUID of the VM to its corresponding MCS label 240.

Other embodiments of the invention may utilize MCS labeling to apply different granularity of security control to a VM and its resources based on different aspects of security control. For example, the type field 230 may be used to define general security behaviors, such as VMs that cannot access network resources and then use the MCS field 240 to isolate theses specific types of VMs from each other by using the UUID of each machine in this field. In this way, the type field 230 may be used to provide a general isolation and then the MCS field 240 to further isolate from each other.

In one embodiment, the security label may be kept in a configuration file of the VM. The security label may be assigned to a user of a VM when the user logs into the system. In another embodiment, the security label is assigned to the VM when the VM actually boots up. In some embodiments, security information associated with a VM may be conveyed throughout the system via the virtualization library in the virtual driver.

FIG. 3 is a flow diagram illustrating a method 300 for implementing a security policy on VMs in a process-based virtualization system according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by process-based virtualization system 100 of FIG. 1.

Method 300 begins at 310, a security policy is maintained by a host kernel of a process-based virtualization system. The security policy operates to mediate access between a VM and any other VMs running on the system. In one embodiment, the security policy is a MAC policy. In some embodiments, the security policy is kept in modules in the kernel that define the interactions between different security labels for the kernel to enforce so that VMs cannot bypass the security policy. In one embodiment, the security policy may be stored in virtualization library 125 of virtualization driver 120 described with respect to FIG. 1. In other embodiments, the security policy is stored in host kernel 110 described with respect to FIG. 1.

Then, at block 320, a VM is initialized in a process-based virtualization system. In some embodiments, the VM is a process initiated in guest mode by KVM in a Linux system. In one embodiment, the Linux system may be SELinux. In another embodiment, the Linux system may be a SELinux/Flask model. FLASK (Flux Advanced Security Kernel) is an operating system security architecture that provides flexible support for security policies.

At block 330, a security label is assigned to the initialized VM. The security label is different from the security label of any other VM running in the system. The security label may be provided by a user or generated automatically. In one embodiment, the security label has the format of security label 200 described with respect to FIG. 2. In other embodiments, the security label may be implemented as any of the other embodiments described above with respect to FIG. 2.

Finally, at block 340, the security policy utilizes the security label of the VM to enforce isolation of the VM from other VMs in the system. In embodiments of the invention, the security policy should operate to provide strong isolation between active VMs in a process-based virtualization system. The security policy also should provide improved control over access to VM resources. For instance, distinct MAC labeling of resources belonging to VMs (e.g., disk images, disk partitions, etc.) binds VM instances to those resources, ensuring that VMs can only access their own resources. This can protect the VM from invalid VM resources and protect VM resources from flawed or misconfigured VMs. In addition, the security policy should improve control over access to shared resources. For example, where VMs share resources (e.g., miscellaneous devices, virtual networking, read-only disk images, etc.), a fine-grained MAC policy may be specified to control information flow between VMs.

Moreover, some embodiments of the security policy may provide for fine-grained interaction with the host. With distinct labeling of VMs and their resources, interactions with host entities on a per-VM basis may then be controlled by MAC policy. An example of this would be to safely allow different users on the host to administer different VMs. In one embodiment, configuration of this system could be managed via the role-based access control (RBAC) scheme integrated with SELinux.

Additionally, some embodiments of the security policy may provide for coarse MAC containment of VMs. High-level security constraints may be applied to different VMs, to allow simplified lock-down of the overall system. For example, a VM may be restricted so that it cannot transmit Transmission Control Protocol (TCP) traffic on port 25 via virtual networking (i.e., the guest cannot be used as a spam-bot even if it is compromised via a rootkit).

Finally, some embodiments of the security policy may leverage the general MAC architecture. As MAC is extended to the desktop, it will be possible to apply uniform MAC policy to the operating system (OS), desktop and Linux-based virtualization components. This will provide a basis for a variety of sophisticated security applications such as a virtualized desktop with different windows running VMs at different security levels.

In another embodiment, DAC labeling may be utilized to provide security separation between VMs. DAC labeling provides VMs with different user IDs and the VMs thereby benefit from the standard protection between different user IDs.

Figure 4:
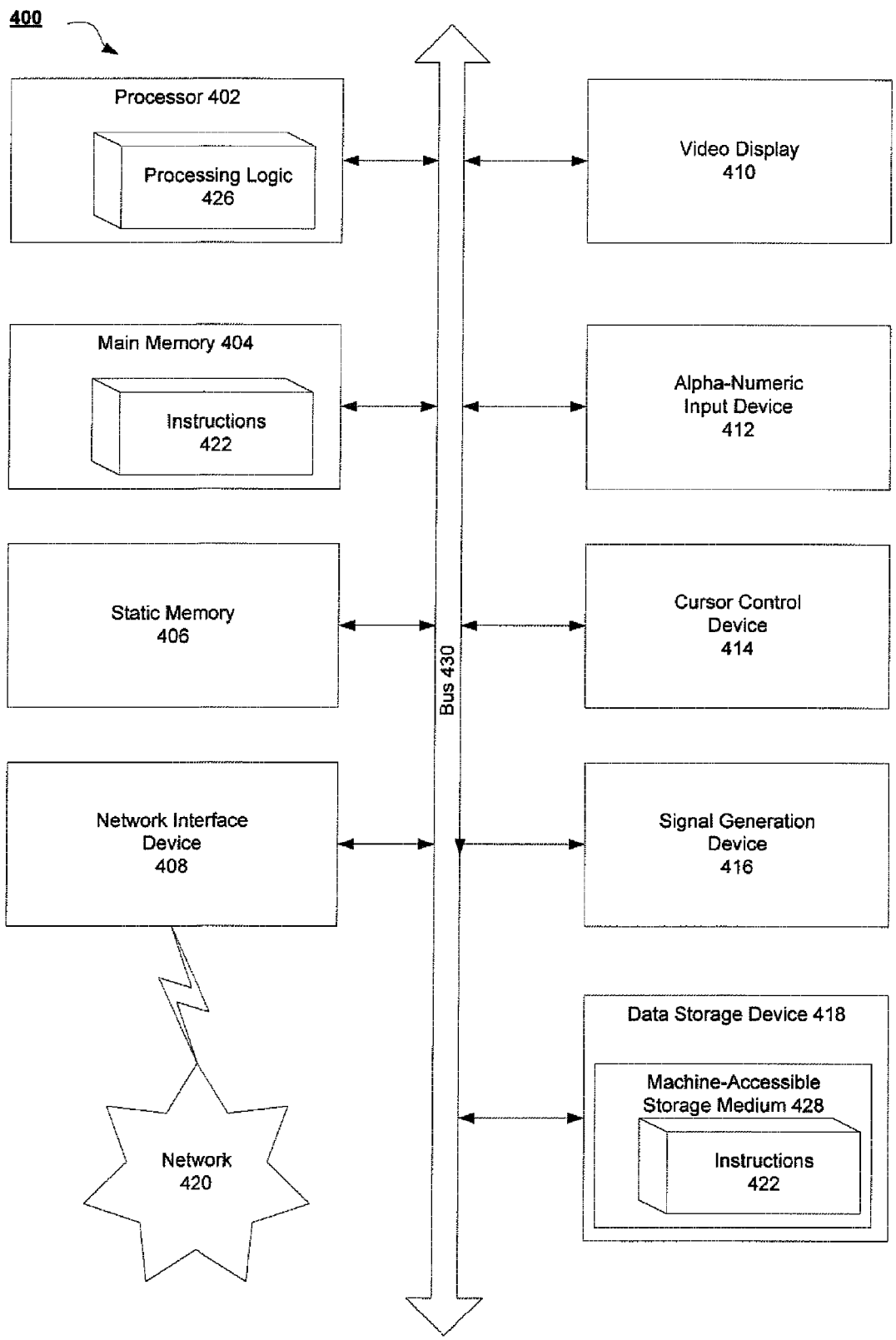
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to implement the security described in embodiments of the invention for process-based virtualization system 100 described with respect to FIG. 1, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   maintaining, by a processing device of a computing device, a security policy for a process-based virtualization system executed by the processing device on the computing device;
   initializing, by the processing device, a virtual machine (VM) in the process-based virtualization system;
   allocating, by the processing device to the VM, a category from a plurality of categories of a multi-category system (MCS) label of a SELINUX operating system (OS) to the VM, wherein the allocated category for the VM is distinctive to the VM and differentiates the VM from other VMs initialized in the process-based virtualization system, wherein the security policy comprises an access control method in the SELINUX OS that uses the plurality of categories to isolate the VM from the other VMs, and wherein the plurality of categories of the MCS label is repurposed for each category of the plurality of categories to be different from one another in order to isolate the VM from the other VMs;
   assigning, by the processing device, the allocated category of the MCS label to an MCS field of an SELINUX OS multi-level security (MLS) label of the SELINUX OS associated with the VM;
   mapping, by the processing device, a unique identifier (UUID) of the VM to the MCS label of the VM; and
   enforcing, by the processing device, the security policy on the VM based on the MCS field of the MLS label of the VM in order to isolate the VM from the other VMs initialized in the process-based virtualization system.

2. The method of claim 1, wherein the MLS label comprises the UUID of the VM as part of the MLS label.

3. The method of claim 1, wherein the security policy is utilized by a host kernel of the process-based virtualization system to mediate access between the VM and the other VMs in the process-based virtualization system.

4. The method of claim 1, wherein the process-based virtualization system is a kernel-based virtualization model (KVM) system.

5. The method of claim 1, wherein the security policy for the VM is stored in a virtualization library in an operating system (OS) of the computing device.

6. The method of claim 1, wherein multiple parts of the MLS label are utilized to provide different levels of security to the VM.

7. A system, comprising:
a memory;
a processing device communicably coupled to the memory;
a virtual library communicably coupled to the memory and the processing device, the virtual library to store and maintain a security policy for a process-based virtualization scheme implemented by the system; and
a virtualization driver executable from the memory by the processing device and communicably coupled to the virtual library, the virtualization driver to:
  initialize the VM using the process-based virtualization scheme;
  allocate, to the VM, a category from a plurality of categories of a multi-category system (MCS) label of a SELINUX operating system (OS) to the VM, wherein the allocated category for the VM is distinctive to the VM and differentiates the VM from other VMs initialized in the process-based virtualization system, wherein the security policy comprises an access control method in the SELINUX OS that uses the plurality of categories to isolate the VM from the other VMs, and wherein the plurality of categories of the MCS label is repurposed for each category of the plurality of categories to be different from one another in order to isolate the VM from the other VMs;
  assign the allocated category of the MCS label to an MCS field of an SELINUX OS multi-level security (MLS) label of the SELINUX OS associated with the VM; and
  map a unique identifier (UUID) of the VM to the MCS label of the VM; and
  enforce the security policy on the VM based on the MCS field of the MLS label of the VM in order to isolate the VM from the other VMs initialized in the process-based virtualization system.

8. The system of claim 7, wherein the MLS label comprises the UUID of the VM as part of MLS label.

9. The system of claim 7, wherein the process-based virtualization scheme is a kernel-based virtualization model (KVM) system.

10. The system of claim 7, wherein the virtualization driver is further operable to mediate access between the VM and the other VMs in the system.

11. The system of claim 7, wherein one or more MLS labels are applied to individual resources on the VM.

12. A non-transitory machine-readable storage medium including data that, when accessed by a processing device, cause the processing device to:
  maintain, by the processing device of a computing device, a security policy for a process-based virtualization system executed by the processing device on the computing device;
  initialize, by the processing device, a virtual machine (VM) in the process-based virtualization system;
  allocate, by the processing device to the VM, a category from a plurality of categories of a multi-category system (MCS) label of a SELINUX operating system (OS) to the VM, wherein the allocated category for the VM is distinctive to the VM and differentiates the VM from other VMs initialized in the process-based virtualization system, wherein the security policy comprises an access control method in the SELINUX OS that uses the plurality of categories to isolate the VM from the other VMs, and wherein the plurality of categories of the MCS label is repurposed for each category of the plurality of categories to be different from one another in order to isolate the VM from the other VMs;
  assign, by the processing device, the allocated category of the MCS label to an MCS field of an SELINUX OS multi-level security (MLS) label of the SELINUX OS associated with the VM;
  map, by the processing device, a unique identifier (UUID) of the VM to the MCS label of the VM; and
  enforce, by the processing device, the security policy on the VM based on the MCS field of the MLS label of the VM in order to isolate the VM from the other VMs initialized in the process-based virtualization system.

13. The non-transitory machine-readable storage medium of claim 12, wherein the MLS label uses the UUID of the VM as part of the MLS label.

14. The non-transitory machine-readable storage medium of claim 12, wherein the security policy is utilized by a host kernel of the process-based virtualization system to mediate access between the VM and the other VMs in the process-based virtualization system.

15. The non-transitory machine-readable storage medium of claim 12, wherein the process-based virtualization system is a kernel-based virtualization model (KVM) system.

16. The system of claim 7, wherein multiple parts of the MLS label are utilized to provide different levels of security to the VM.

17. The non-transitory machine-readable storage medium of claim 12, wherein the security policy for the VM is stored in a virtualization library in an operating system (OS) of the computing device.

18. The non-transitory machine-readable storage medium of claim 12, wherein multiple parts of the MLS label are utilized to provide different levels of security to the VM.

* * * * *